(12) United States Patent
O'Flaherty et al.

(10) Patent No.: US 7,778,802 B2
(45) Date of Patent: Aug. 17, 2010

(54) WIRELESS DEVICES AS GUARD TOUR CHECKPOINT DATA COLLECTION AND CHECKPOINT DATA COMMUNICATION DEVICES

(75) Inventors: Michael B. O'Flaherty, Streetsboro, OH (US); Barry J. Markwitz, Solon, OH (US)

(73) Assignee: TimeKeeping Systems, Inc., Solon, OH (US)

( * ) Notice: Subject to any disclaimer, the term of this patent is extended or adjusted under 35 U.S.C. 154(b) by 328 days.

(21) Appl. No.: 11/120,026

(22) Filed: May 2, 2005

(65) Prior Publication Data
US 2006/0248167 A1    Nov. 2, 2006

(51) Int. Cl.
*G06F 15/16* (2006.01)
(52) U.S. Cl. .............. 702/187; 702/108; 702/122; 702/182; 702/81; 702/188; 340/506; 340/573.1; 340/539.1; 340/574; 340/539.11; 709/219
(58) Field of Classification Search ............ 702/108, 702/122, 182, 81, 187, 188; 340/506, 573.1, 340/539.1, 540, 539.11, 574; 709/219
See application file for complete search history.

(56) References Cited
U.S. PATENT DOCUMENTS

| | | | | |
|---|---|---|---|---|
| 3,736,561 A | * | 5/1973 | Rumpel | 340/825.22 |
| 3,781,845 A | * | 12/1973 | Ellul | 340/306 |
| 3,990,067 A | * | 11/1976 | Van Dusen et al. | 340/306 |
| 4,086,577 A | * | 4/1978 | Elgersma | 340/306 |
| 4,672,654 A | * | 6/1987 | Vanacore | 379/49 |
| 4,800,590 A | * | 1/1989 | Vaughan | 713/184 |
| 5,399,844 A | * | 3/1995 | Holland | 235/376 |
| 5,572,192 A | * | 11/1996 | Berube | 340/574 |
| 5,572,195 A | * | 11/1996 | Heller et al. | 340/825.49 |
| 5,623,258 A | * | 4/1997 | Dorfman | 340/10.41 |
| 6,078,255 A | * | 6/2000 | Dividock et al. | 340/539.1 |
| 6,894,617 B2 | * | 5/2005 | Richman | 340/573.1 |
| 7,286,048 B2 | * | 10/2007 | Adams | 340/506 |
| 2003/0206100 A1 | * | 11/2003 | Richman et al. | 340/506 |
| 2004/0046654 A1 | * | 3/2004 | Adams | 340/506 |
| 2005/0222889 A1 | * | 10/2005 | Lai et al. | 705/9 |

* cited by examiner

*Primary Examiner*—Carol S Tsai
(74) *Attorney, Agent, or Firm*—James A. Hudak

(57) ABSTRACT

A system that utilizes wireless devices as guard tour checkpoint data collection and checkpoint data communication devices is disclosed. The wireless devices have the capability of reading various types of checkpoints and communicating the collected checkpoint data with a computer via a cellular telephone communication system and either a land-based telephone network or the Internet or a cellular data communication device. Alternatively, a Wi-Fi network or the Wi-Fi network and the Internet can be used to communicate collected checkpoint data with the computer. The computer stores and processes the data according to guard tour expected performance parameters, such as rules, schedules, and exceptions, and then generates the necessary commands to produce exception notifications and reports at various types of peripheral equipment.

18 Claims, 4 Drawing Sheets

US 7,778,802 B2

WIRELESS DEVICES AS GUARD TOUR CHECKPOINT DATA COLLECTION AND CHECKPOINT DATA COMMUNICATION DEVICES

TECHNICAL FIELD

The present invention relates, in general, to a guard tour system and, more particularly, to a guard tour system that utilizes wireless devices as guard tour checkpoint data collection and checkpoint data communication devices.

BACKGROUND ART

Present guard tour systems usually require the use of proprietary hardware for the acquisition, storage and communication of data that have been collected. Such hardware devices read and time stamp the data that have been provided from one of many different types of media, such as barcodes, touch buttons, magnetic strips, etc. The data collection, storage and communication devices are often specific to the type of media being read. Analysis and reporting of collected data do not occur until after the guard's tour is finished and the data collection device has been placed into a downloading device permitting communication of the collected data with a computer.

In use, such guard tour systems typically employ one of the aforementioned media types to serve as guard identifiers, checkpoint identifiers and incident identifiers. (As used herein, the term "incident" refers to an occurrence involving a security related condition that is found during the course of a guard tour.) A guard starts a tour by reading his or her identification information with a proprietary device or by keying this identification information into the device if the media type is not appropriate for this use, thus storing the guard's identification information, along with a time stamp in the device's memory. (It should be noted that the guard could read his or her identification information into the proprietary device or by keying this identification information into the device at any time during the tour, rather than at the beginning of the tour, without affecting the operation of the system). While on tour the guard uses the same proprietary device to read and time stamp data at checkpoints positioned at predetermined tour locations. If incidents occur during the guard's tour, the guard again uses the proprietary device to read and time stamp, or key in, if the media type is not appropriate for this use, data that corresponds to each incident. The result is a list of data and time stamp pairs that define the guard's activity during the course of the tour. When the guard finishes the tour, the collected data are transferred or downloaded to a computer, typically by placing the proprietary data collection device in a proprietary downloading device which is connected to the computer. After the data are transferred to the computer, software within the computer performs analysis and reporting of the data.

Because proprietary devices specific to the type of media being utilized are required to collect and communicate guard tour checkpoint data, and the analysis and reporting of collected tour checkpoint data occur only after a tour is finished and the data collection device has been placed into the downloading device, it has become desirable to develop a guard tour system that utilizes commonly available wireless devices, rather than proprietary devices, to collect and communicate checkpoint data relating to a guard tour.

SUMMARY OF THE INVENTION

The present invention solves the problems associated with the use of present proprietary devices for the collection and communication of checkpoint data relating to a guard tour, and other problems, by using commonly available wireless devices in place of the aforementioned proprietary devices. When a wireless device, such as a cellular telephone, has built-in data acquisition capability that is appropriate for the media type to be read on a guard tour, no external hardware is required. However, if this is not the case, the cellular telephone can be fitted with external data acquisition hardware that is appropriate for the media type to be read. For example, barcode scanner attachments for cellular telephones are presently available and data acquisition attachments for numerous other media types, such as Dallas Touch Buttons and radio frequency identification (RFID) tags, are available. In addition to utilizing commonly available cellular telephone hardware, the present invention allows data to be downloaded or transferred to a central site in real-time or near-time, as well as in the batch mode that is typically used with presently available technology.

In the present invention, cellular telephones fitted with barcode scanning attachments are used with bar-coded guard identification badges, bar-coded checkpoint labels and bar-coded incident books. At the start of a guard tour, the guard scans his or her identification information with the barcode scanning attachment on the cellular telephone. The software associated with the present invention reads the guard identification barcode data and stores this data, along with a time stamp, in the memory of the cellular telephone. The checkpoints in the guard's tour are then scanned in the same manner, i.e., the software associated with the present invention reads the barcode data associated with a checkpoint and stores this data, along with a respective time stamp for same, in the memory of the cellular telephone. If incidents occur during the course of the guard tour, the guard can scan barcodes from a page or book that corresponds to the incident that occurred, or enter it on the cellular telephone's keypad. In this instance, the software associated with the present invention reads the incident barcode data, or the data entered from the cellular telephone's keypad, and stores this data, along with a respective time stamp for same, in the memory of the cellular telephone. When the guard has completed the tour, the data that have been collected and stored in the memory of the cellular telephone can be transmitted to a central computer via an existing cellular telephone communication system of the appropriate type, such as a TDMA (Time Division Multiple Access) system, a CDMA (Code Division Multiple Access) system, a GSM (Global System for Mobile Communications), or another type of communication system, such as a Wi-Fi network that communicates through the Internet. After the data has been successfully transmitted, the collected data within the memory of the cellular telephone are cleared. The cellular telephone communication system can be connected to an existing land-based telephone network which, in turn, is connectable to a computer by a modem or other connection device permitting the computer to receive data transmissions from the cellular telephones. It should be noted that the computer can be connected to the cellular telephone communication system without the use of a land-based telephone communication network, or via the Internet. The computer is equipped with guard tour software which incorporates rules, schedules, or other guard tour parameters that define expected performance of guard duties while on tour. The computer analyzes the collected data with respect to these rules, schedules and other parameters and generates commands to produce exception notifications and reports at various output devices.

It should be noted that cellular telephones which include Bluetooth short-range wireless technology, along with Bluetooth enabled checkpoints, can be utilized. In this case, the keypad on the cellular telephone is used to input guard identification information and incident data while Bluetooth technology is utilized to read Bluetooth enabled checkpoints positioned along the guard tour. A guard tour begins when the first checkpoint included within the tour is detected. This detection event causes the cellular telephone to read and time stamp the checkpoint data, and prompts the guard to key in his or her identification information which is also time stamped. The guard then proceeds to other checkpoints on the tour and each checkpoint is automatically detected, read and time stamped by the cellular telephone. If incidents occur during the course of the tour, the guard can enter same using the keypad on the cellular telephone. The incidents that are entered are automatically time stamped. Instructional prompts may be provided on the cellular telephone display, along with relevant questions regarding the incident, which must be answered by means of the keypad. When the guard has completed the tour, the data that have been collected and stored in the memory of the cellular telephone can be transmitted automatically to a central computer, as previously described. After the data have been successfully transmitted, the collected data within the memory of the cellular telephone are cleared.

It should also be noted that if a continuous connection exists, the data transmissions can occur immediately after each data item is read for real-time reporting of tour events. In this case time stamping of the data can be done by the wireless device or, alternatively, by any computer receiving the data in real-time. Alternatively, the cellular telephone can be programmed to dial the central computer immediately after each item is read for near-time reporting of tour events. Also, the cellular telephones can be utilized to automatically summon the appropriate emergency services when predetermined incidents occur. Furthermore, E911 cellular positioning technology can be utilized to provide the location of the cellular telephone at the time of data transmission. This feature can be used to locate guards on tour and confirm when they report for work or leave their assigned posts. Wireless devices, such as cellular telephones that incorporate global positioning systems (GPS) capabilities, local positioning system capabilities, or other positioning system capabilities, can be used in the same manner.

DESCRIPTION OF THE PREFERRED EMBODIMENT

Figure 1A:
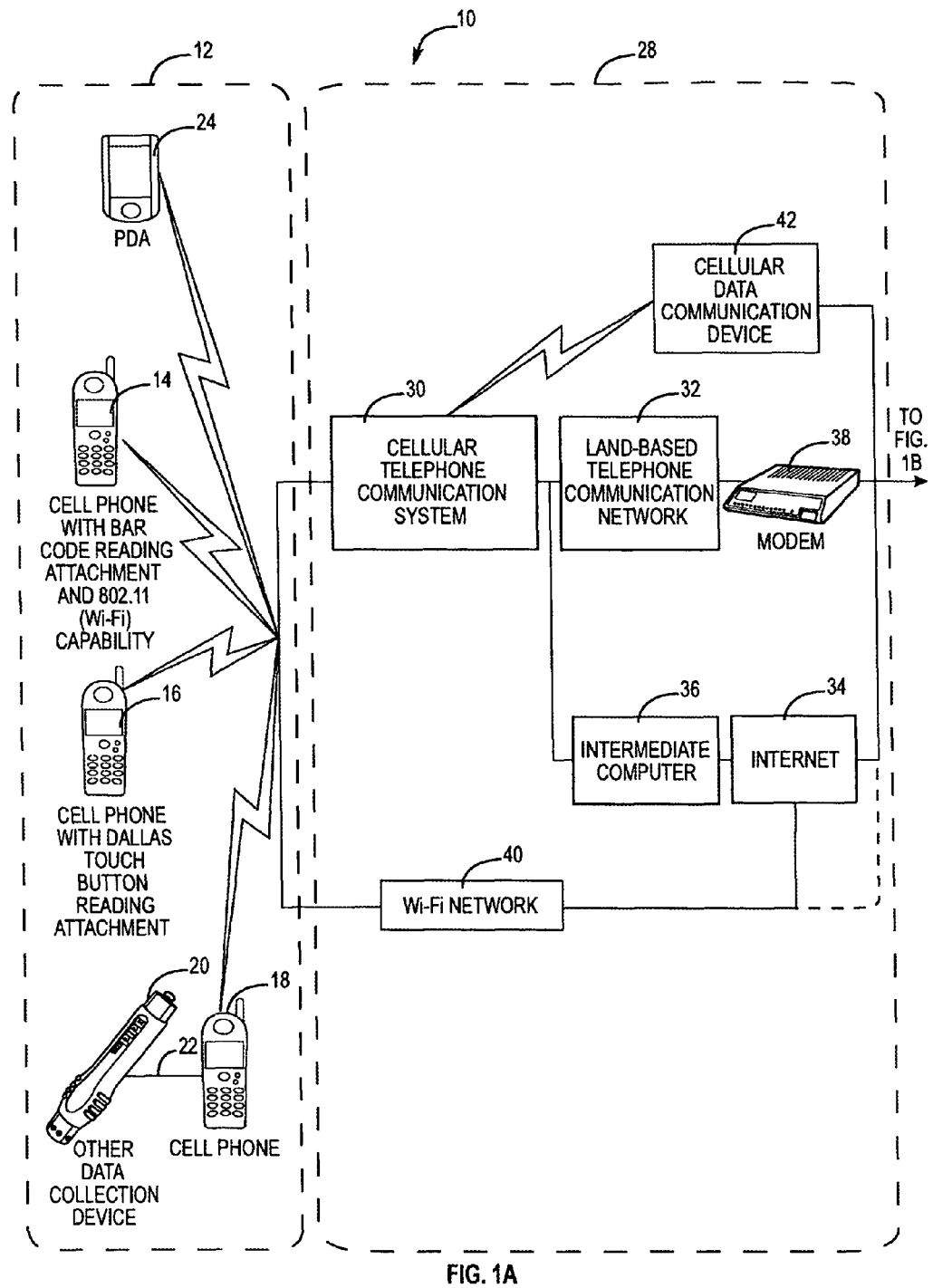
FIGS. 1A and 1B are schematic diagrams of the system of the present invention utilizing one or more wireless devices as guard tour checkpoint data collection and checkpoint data communication devices.
Figure 1B:
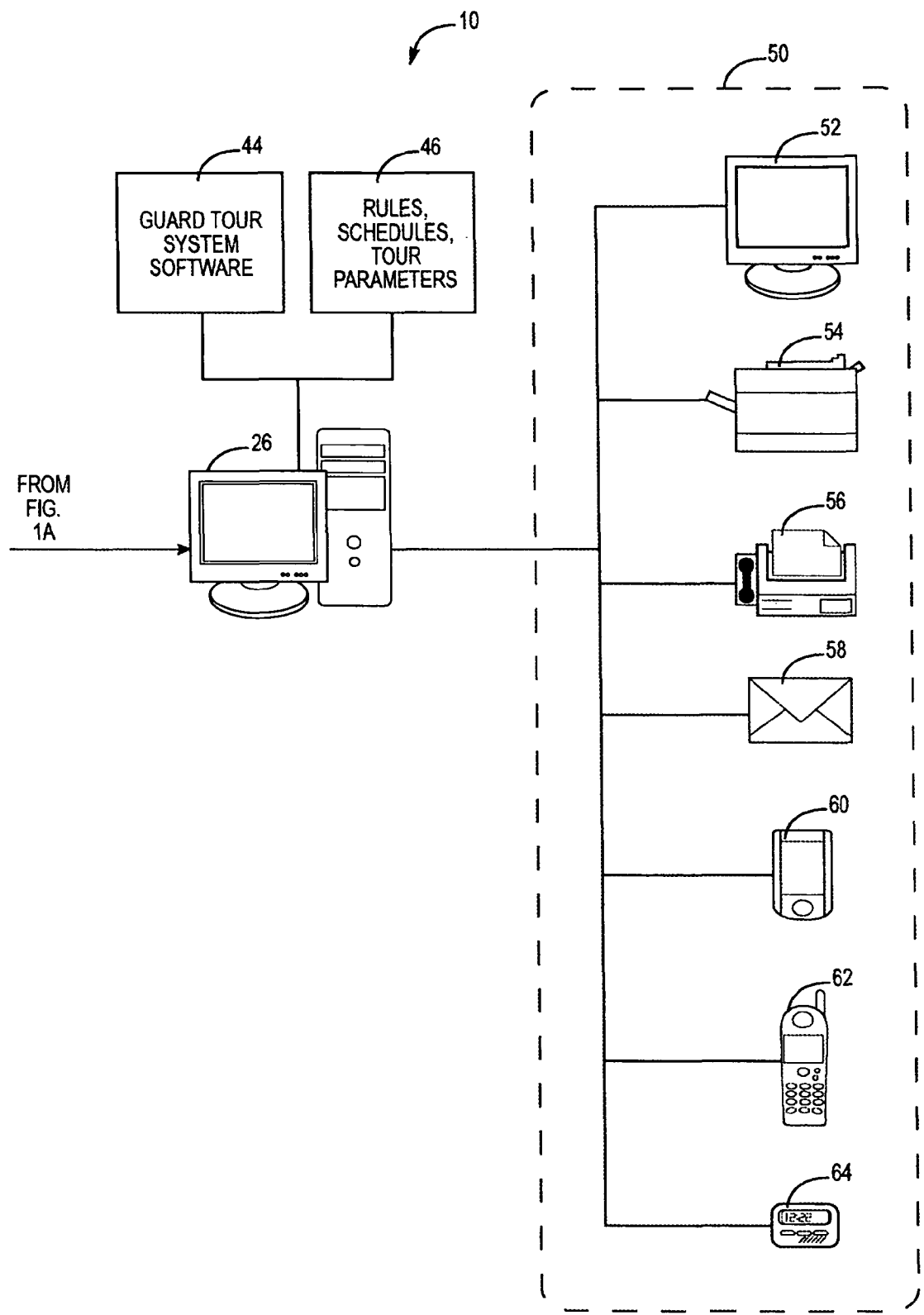

Referring now to the Figures where the illustrations are for the purpose of describing the preferred embodiment of the present invention and are not intended to limit the invention disclosed herein, FIGS. 1A and 1B are schematic diagrams of the overall system 10 of the present invention utilizing one or more wireless devices, shown generally by the numeral 12, as guard tour checkpoint data collection and checkpoint data communication devices. The wireless devices 12 can include cellular telephones 14, 16 and 18 having various types of data collection devices 20 associated therewith. For example, cellular telephone 14 can have a barcode reading attachment associated therewith and can have Wi-Fi capability; cellular telephone 16 can have a Dallas Touch Button reading attachment associated therewith; and cellular telephone 18 can have other types of data collection devices 20 associated therewith via an infrared, serial, radio frequency, or other type of link, shown generally by the numeral 22. Furthermore, a PDA 24 with an integrated cellular telephone and/or Wi-Fi capability can be utilized. In any event, the cellular telephones 14, 16, and 18 and/or PDA 24 have a memory incorporated therein to store the data that has been collected.

The cellular telephones 14, 16 and 18 and/or the PDA 24 are connectable to a computer 26 via a wireless communication network, shown generally by the numeral 28. The wireless communication network 28 can utilize an existing cellular telephone communication system of the appropriate type, such as a TDMA (Time Division Multiple Access) system, a CDMA (Code Division Multiple Access) system, a GSM (Global System for Mobile Communications), shown generally by the numeral 30, or another type of system, that is connectable to an existing land-based telephone network, shown generally by the numeral 32, or to the Internet 34, via an optional intermediate computer 36. A modem or other device 38 is utilized to connect the land-based telephone network 32 to the computer 26 to receive data transmissions from the cellular telephones 14, 16, and 18 and/or the PDA 24. Alternatively, the computer 26 is connectable to the Internet 34 to receive data transmissions from the cellular telephones 14, 16 and 18 and/or the PDA 24, via the existing cellular telephone communication system 30. Furthermore, the computer 26 can receive data communications from the cellular telephones 14, 16 and 18 and/or the PDA 24 directly via a Wi-Fi network 40 based on the IEEE 802.11 specification, or from the Wi-Fi network 40, via the Internet 34. Also, the computer 26 can receive data communications from the cellular telephones 14, 16 and 18 and/or the PDA 24 from the existing cellular telephone communication system 30, via a cellular data communication device 42.

The computer 26 is equipped with guard tour software, shown generally by the numeral 44, which incorporates a definition of rules, schedules, and other guard tour parameters, shown generally by the numeral 46, that define expected performance of guard duties while on tour. In addition, the guard tour software 44 analyzes guard tour data collected and transmitted by the cellular telephones 14, 16, and 18 and/or the PDA 24 with respect to these rules, schedules, and other guard tour parameters 46. The computer 26 generates commands as instructed by the guard tour software 44 to produce exception notifications and reports at various output devices, shown generally by the numeral 50, which includes workstations 52, printers 54, and facsimile machines 56. Alternatively, the computer 26 can provide information and notify individuals of exceptions that require attention through email messages 58, PDAs 60, cellular and other telephones 62, or pagers 64.

Figure 2A:
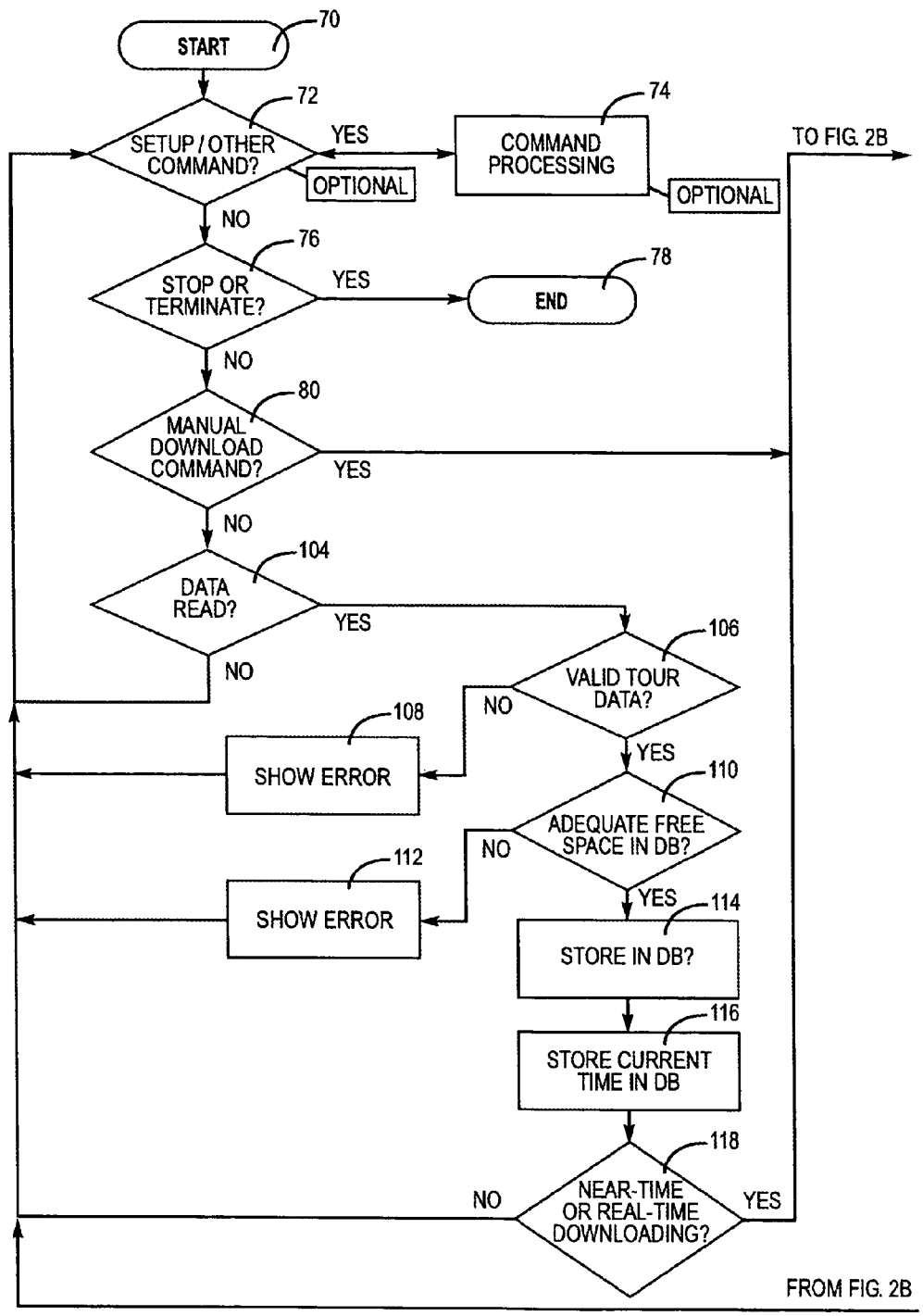
FIGS. 2A and 2B are flow charts of the software that executes within the cellular telephones and other programmable devices having cellular telephone communication capabilities making the cellular telephones and other programmable devices useful as guard tour checkpoint data collection and checkpoint data communication devices.
Figure 2B:
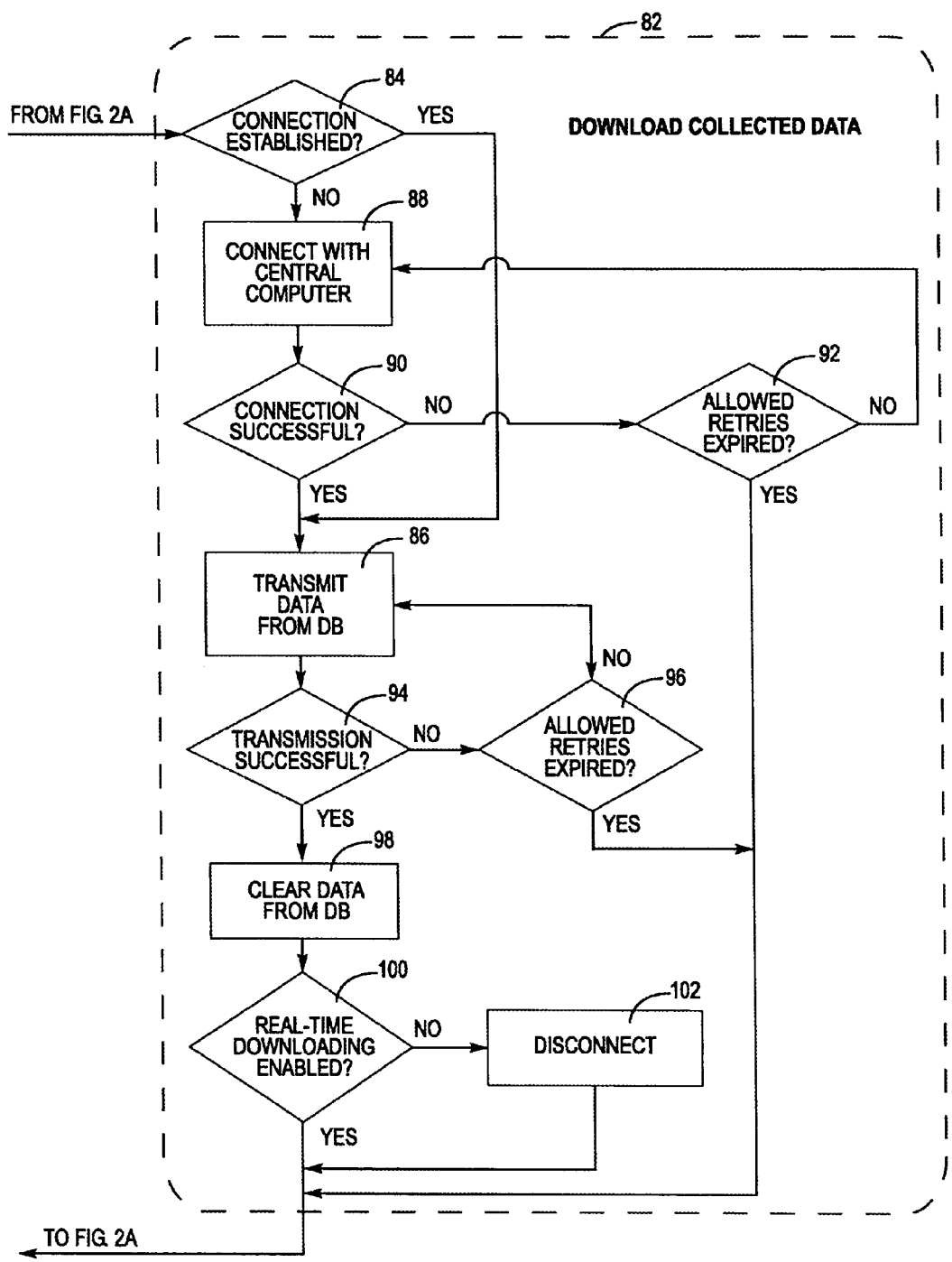

Referring now to FIGS. 2A and 2B, flow charts are shown of the software that executes within the cellular telephones 14, 16 and 18, and/or the PDA 24 making the cellular telephones and/or the PDA useful as guard tour checkpoint data collection and checkpoint data communication devices. Cellular telephone operating systems commonly provide a means of loading and activating programs, as generally shown in block 70. The program can be activated and configured manually via the keypad and display on the cellular telephone in which case optional blocks 72 and 74 are invoked. Alternatively, by using a personal computer, the program can be preconfigured and set to activate upon loading into the cellular telephone in which case blocks 72 and 74 are not utilized. Block 72 provides an optional check for program setup and other possible commands. If such commands are detected, they are passed to block 74 for processing. In block 74, parameters such as the telephone number to dial for data downloading, the maximum number of retries permitted when attempting to establish a connection can be entered, and the enabling and disabling of real-time or near-time downloading can be configured using the keypad and display on the cellular telephone. If present, all program setup commands are password protected. Upon completing such functions, the program again checks for other commands or events.

Referring now to block 76, the program checks whether the user of the cellular telephone and/or the PDA has stopped or terminated the program. If the user has stopped or terminated the program, the program is ended, as shown in block 78. If the cellular telephone and/or PDA user has not stopped or terminated the program, the program checks whether the cellular telephone user has initiated a manual download of collected data in block 80. If the user has initiated a manual download of collected data, the data download process, shown generally by the numeral 82, is initiated. In the data download process 82, the program checks whether a connection has been established in block 84. If a connection has been established, the collected data are transmitted from the cellular telephone and/or PDA to the central computer in block 86. If a connection has not been established, the cellular telephone and/or PDA call the central computer, as shown in block 88. A check is then made in block 90 as to whether the connection was successful. If the connection was not successful, the allowed maximum number of attempts or retries to establish a connection is checked in block 92. If the maximum number of attempts or retries has not been made, the cellular telephone and/or the PDA again attempts to connect to the central computer in block 88. If the maximum number of attempts or retries to establish a connection between the cellular telephone and/or the PDA and the central computer have occurred without success, the system reverts back to its beginning in block 72. In this case, further attempts to download the data will be made either immediately after the next tour data is read or by the use of a manual data download. As previously mentioned, if the connection was successful, the collected data are transmitted from the cellular telephone and/or PDA to the central computer in block 86. A check is then made in block 94 as to whether the transmission of data to the central computer was successful. If the transmission of data from the database to the central computer was not successful, the allowed maximum number of attempts or retries to transmit the data is checked in block 96. If the maximum number of attempts or retries has not been made, the cellular telephone and/or the PDA again attempts to transmit the data in block 86. If the maximum number of attempts or retries to transmit the data from the cellular telephone and/or PDA to the central computer have occurred without success, the system reverts back to its beginning in block 72. In this case, further attempts to download the data will be made either immediately after the next tour data is read or by the use of a manual download process. If the transmission of data from the cellular telephone and/or PDA to the central computer was successful, the data are cleared from the memory in the cellular telephone and/or PDA in block 98. The system then determines whether real-time downloading is enabled in block 100. If real-time downloading is enabled, the system reverts to its beginning in block 72 without terminating the connection. If real-time downloading is not enabled, the connection is terminated in block 102 and the system reverts to its beginning in block 72.

If the cellular telephone and/or PDA user has not initiated a manual download of collected data in block 80, a check is made as to whether the tour data have been read in block 104. If tour data have not been read, the system reverts back to its beginning in block 72. If tour data have been read, a check as to whether the data are valid tour data is made in block 106. If the data are not valid tour data, an appropriate error and/or suitable alarm is sounded in block 108 and the system reverts back to its beginning in block 72. If the data are valid tour data, a check is made in block 110 as to whether adequate space exists in the memory of the cellular telephone and/or the PDA for the data. If there is inadequate space in the memory of the cellular telephone and/or the PDA for the data, an appropriate error and/or suitable alarm is sounded in block 112 and the system reverts back to its beginning in block 72. If there is adequate space in the memory of the cellular telephone and/or the PDA for the data, the data are stored in the memory of the cellular telephone and/or the PDA, as shown in block 114. The current time associated with the storage of the data in also noted, as shown in block 116. A check is then made as to whether near-time or real-time downloading of data is enabled in block 118. If near-time or real-time downloading of data is not enabled, the system reverts back to its beginning in block 72, and the collected data will be manually downloaded at a later time. If near-time or real-time downloading is enabled, the data download process, shown generally by the numeral 82, commences.

Certain modifications and improvements will occur to those skilled in the art upon reading the foregoing. It is understood that all such modification and improvements have been deleted herein for the sake of conciseness and readability, but are properly within the scope of the following claims.

We claim:

1. A system utilizing wireless devices as guard tour checkpoint data wireless communication devices, said wireless devices including media reading means for reading guard tour checkpoint data from various types of media, said system comprising a computer device, means for wirelessly communicating checkpoint data read by said wireless devices to said computer device, said checkpoint data communicating means wirelessly communicating said guard tour checkpoint data to said computer device without the use of a downloading device, said guard tour checkpoint data being communicated by said checkpoint data communicating means even if said guard tour checkpoint data indicates the existence of a normal condition at said guard tour checkpoint, means for time stamping said guard tour checkpoint data read from said media, and means for transmitting checkpoint data processed by said computer device to an end user.

2. The system as defined in claim 1 wherein said wireless devices comprises cellular telephones and other devices having cellular telephone communication capabilities and said checkpoint data communicating means comprises a cellular telephone network.

3. The system as defined in claim 1 wherein said wireless devices comprises cellular telephones and other devices having cellular telephone communication capabilities and said checkpoint data communicating means comprises a cellular telephone network, a land-based telephone network and means for interfacing said computer device to said land-based telephone network.

4. The system as defined in claim 1 wherein said wireless devices comprises cellular telephones and other devices having Wi-Fi communication capabilities and said checkpoint data communicating means comprises a Wi-Fi network.

5. The system as defined in claim 1 wherein said wireless devices comprises cellular telephones and other devices having Wi-Fi communication capabilities and said checkpoint data communicating means comprises a Wi-Fi network and the Internet.

6. The system as defined in claim 1 wherein said computer device processes said guard tour checkpoint data according to predefined guard tour performance parameters and transmits commands to produce notifications and reports to peripheral equipment.

7. The system as defined in claim 6 wherein said predefined guard tour performance parameters comprises rules, schedules and exceptions relating to said guard tour.

8. The system as defined in claim 1 wherein said media reading means comprises media reading devices that are connectable to said wireless devices, said media reading devices being compatible with said various types of media.

9. The system as defined in claim 1 wherein said media reading means comprises software that executes within the memory of said wireless devices.

10. The system as defined in claim 1 wherein said time stamping means comprises software that executes within the memory of said wireless devices.

11. The system as defined in claim 1 wherein said checkpoint data communicating means comprises software contained within said wireless devices, said software causing said wireless devices to establish a connection with said computer device, transmit said checkpoint data to said computer device, and terminate said connection with said computer device after said guard tour checkpoint data have been transmitted thereto.

12. The system as defined in claim 1 wherein said checkpoint data communicating means utilizes an existing cellular communication network to transmit said guard tour checkpoint data to said computer device.

13. The system as defined in claim 1 wherein said checkpoint data communicating means comprises software contained within said computer device, said software enabling said computer device to receive said guard tour checkpoint data from said wireless devices.

14. The system as defined in claim 1 further including data storage means.

15. The system as defined in claim 14 wherein said data storage means is located within said wireless devices.

16. The system as defined in claim 14 wherein said data storage means stores guard tour checkpoint data for downloading to said computer device at a later time.

17. The system as defined in claim 14 wherein said data storage means stores guard tour checkpoint data until said checkpoint data communicating means can transmit said checkpoint data to said computer device.

18. The system as defined in claim 1 further including various types of peripheral equipment, said checkpoint data transmitting means transmitting said guard tour checkpoint data processed by said computer device to said various types of peripheral equipment for use by said end user.

* * * * *